United States Patent

[11] 3,593,343

[72] Inventor Robert F. Viggers
 7306 57th Ave. N.E., Seattle, Wash. 98115
[21] Appl. No. 738,143
[22] Filed July 19, 1968
[45] Patented July 20, 1971

[54] PROSTHETIC BALL-CHECK HEART VALVE
 7 Claims, 7 Drawing Figs.
[52] U.S. Cl. ................................................... 3/1,
 137/533.11
[51] Int. Cl. ...................................................... A61f 1/22
[50] Field of Search ............................................ 3/1, DIG. 3;
 137/513.5, 533.11, 533.13, 533.15, 519, 519.5,
 331, 332

[56] References Cited
 UNITED STATES PATENTS
1,286,834 12/1918 Taylor ............................ 273/232
1,015,142 1/1912 Criswell ......................... 137/513.5 X
2,600,187 6/1952 Bart ............................... 137/513.5 UX 3,371,352 3/1968 Siposs et al. ..................... 3/1
3,416,159 12/1968 Smeloff et al. ................... 3/1
 FOREIGN PATENTS
773,611 9/1934 France .......................... 137/533.13
 OTHER REFERENCES
"Aortic Valve Prosthesis Incorporating Lightweight Titanium Ball, Dacron Velour Covered Cage and Seat" by D. A. Cooley et al., TRANSACTIONS AMERICAN SOCIETY FOR ARTIFICIAL INTERNAL ORGANS, Vol. XIII, June 16, 1967, pages 93— 100. Copy available in group 335.

Primary Examiner—Richard A. Gaudet
Assistant Examiner—Ronald L. Frinks
Attorney—Robert W. Beach ABSTRACT: A valve ball having a relieved surface forming dimples is confined by a cage mounted on a venturi seat. The seat is secured by sewing to fibrous body membrane a cloth sewing ring received in an external groove of the seat ring. Axially extending frame rods may be joined by a flow-directing or flow-straightening ring to reduce turbulence.

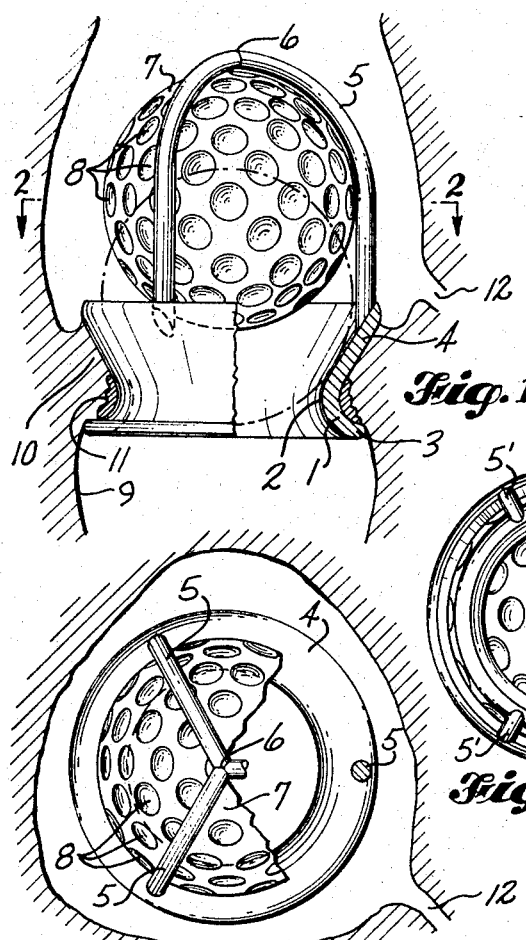
INVENTOR.
ROBERT F. VIGGERS
BY
Robert W. Beach
ATTORNEYS

PROSTHETIC BALL-CHECK HEART VALVE

Frequently a natural heart valve is found to be altered by disease or deterioration so as to be beyond repair and the surgeon must resort to autograft, homograft, heterograft, or prosthetic replacement of such valve. Although prosthetic replacement valves have had generally good success, they have disadvantages over normal, natural heart valves.

Prosthetic heart valves of various types have been proposed but the ball-check valve has been favorably considered because of its simplicity of construction. It has been found, however, that ball-check valves previously used for prosthetic heart valves have experienced an excessive drop in blood pressure across the valve so that the heart was required to work excessively hard to maintain a given blood pressure in the blood circulation system. It is believed that the drop in blood pressure is caused by the turbulent character of the blood flow through the valve, which also causes chattering and consequent wear of the valve parts.

It is the principal object of the present invention to reduce energy loss from turbulence and thereby minimize the drop in pressure across a prosthetic ball-check heart valve and to deter chattering of the valve.

More specifically, it is an object to provide boundary layer control for the valve ball by relieving its surface so as to form dimples, for example, which will postpone turbulence in the flow past the ball.

Another specific object is to direct or control the blood flow past the valve ball in open position so as to reduce the turbulence of the flow downstream from the ball.

It is also an object to provide a valve seat ring which will deter turbulence in the flow of blood through and beyond it.

FIG. 1 is a side elevation of a prosthetic aortic ball-check valve installed in the body and having parts broken away;

FIG. 2 is an outlet end elevation of such valve with parts broken away;

FIG. 3 is a diagrammatic axial section through an aortic ball-check valve of the present invention illustrating flow characteristics of fluid flowing through the valve passage;

FIG. 4 is a similar view of a prior art prosthetic aortic ball-check valve;

FIG. 5 is a side elevation of a modified prosthetic ball-check valve of the present invention with parts being broken away;

FIG. 6 is an end elevation of such valve; and

FIG. 7 is a side elevation of still a different type of prosthetic ball-check valve of the present invention with parts broken away.

A prosthetic heart valve should have various desirable characteristics including the following:

1. The valve should create minimum drop in pressure across it.
2. The lumen through the valve should be maximum and the turbulence should be minimum to minimize the pressure drop across the valve.
3. The valve should open easily and quickly upon application of systolic pressure and it should close quickly and securely upon initiation of diastole without vibration or oscillation.
4. The structure of the valve assembly should be compact and capable of being surgically installed quickly and easily.
5. The valve structure should be made of materials which will be compatible with the body and inert so as to deter thrombosis formation.

The construction of the present prosthetic ball-check heart valve is concerned particularly with achieving minimum pressure drop across the valve and maximum valve ball stability without incurring any disadvantages with respect to any of the other factors listed above.

It is believed that the principal cause of a large drop in pressure across a prosthetic heart valve is the loss in energy resulting from turbulence in the flow of blood through and beyond the valve assembly and perhaps, at least to some extent, the constriction of the lumen through the valve body. In accordance with the present invention, reduction in turbulence of flow of blood through and beyond the valve assembly is accomplished by guiding the flow of blood more effectively and controlling the boundary layer flow over the valve ball so as to postpone separation from the ball surface of the flow of blood past the ball.

The ball-check valve assembly includes the venturi ring 1 having a throat 2 from which the inlet 3 flares in one direction and the outlet 4 flares in the opposite direction. Such ball seat ring carries a cage shown in FIGS. 1 and 2 as including three rods extending axially downstream from the outlet side of the venturi ring and having their end portions remote from the venturi ring curved toward each other and connected by a joint 6 which can be a welded joint. The valve ball 7 is received within and confined by such cage.

As shown best in FIGS. 1 and 2, the rods 5 of the cage are spaced apart so that the ball 7 will have clearance to move freely axially of the cage, but the rods will prevent appreciable movement of the ball transversely of the cage. The curved portions of the rods 5 are curved through an arc of approximately 90° and the radius of each such arc is just slightly greater than the radius of the ball valve 7 so that the ball valve can be embraced closely by the joined portions of the rods as shown in FIG. 1. The joint 6 between the curved end portions of the rods is spaced from the throat to the venturi ring 1 such that the valve ball can move away from its seat on the outlet valve 4 of the seat ring sufficiently to enable flow of blood between the open ball and the outlet valve of the venturi ring with substantially minimum flow constriction.

Although, as shown from the broken lines of FIG. 1, the area of the valve ball which will be exposed to the inlet pressure side of the valve assembly when the valve ball is seated on ring 1 will be considerably less than the area of the valve ball exposed to pressure on the outlet side of the valve assembly, the ratio of such areas will be such that the valve can be opened readily and quickly by a pressure differential across the valve of a few millimeters of mercury. Also, while, as stated, the cage 5 should enable the valve ball 7 to move a sufficient distance from the seat ring to enable adequate flow of blood between the seat ring and the valve ball when it is open, the movement of the ball away from its seat during opening movements should be sufficiently restricted to enable the static pressure of the blood in the aorta to close the valve quickly and tightly when the pressure in the ventricle has subsided during diastole to minimize regurgitation.

The most important characteristic of the present invention is to minimize turbulent flow of blood past and beyond the valve assembly when it is installed in a heart in place of a natural valve. Two factors which contribute to the reduction in turbulent flow are the contour and the surface treatment of the valve passage. In general, the passage wall surface and the entire valve ball surface should be rough or uneven as distinguished from being smooth. Specifically the ball surface can be raised, preferably in a pattern, such as to leave spaced depressions of substantial area shown in FIGS. 1, 2 and 3 as circular dimples 8 distributed substantially uniformly over the entire surface of the ball. The difference between the maximum radius of the ball from its center to the circumference defined by its raised portions and the minimum radius of the ball from its center to the floors of the dimples or other depressions should be within the range of 0.001 to 0.02 of an inch. The spacing between the centers of the dimples or other depressions should be within the range of 0.01 to 0.2 of an inch.

The prosthetic valve assembly is installed in the port 9 of a heart from which a defective natural valve has been removed. When the valve assembly has been inserted in place, the fibrous tissue 10 is sewed to a cloth sewing ring 11 which is located in the bottom of the annular concavity or groove in the exterior of the venturi 1. Consequently the size of the venturi ring should be approximately the same size as the base of the natural valve. Also, it is preferred that the axial extent of the prosthetic valve assembly not be appreciably greater than the axial extent of the cusps of the natural valve. The prosthetic aortic valve, when installed in place of the natural valve, will be located close to the coronary artery 12 as shown in FIGS. 1 and 2.

The importance of providing a relieved surface on the ball valve, such as to provide the dimples 8, to reduce the turbulence in the flow through the valve assembly is illustrated by the diagrams of FIGS. 3 and 4. FIG. 3 represents a structure having optimum flow characteristics while FIG. 4 indicates the flow characteristics through valve assembly having the same structure as that of FIG. 3 except for the surface treatment of the ball. In both instances, the flow will be relatively smooth from the left ventricle 13 through the annular passage 14 between the ball and the outlet valve 4 of the venturi ring. The flow will burble at 15 around the trailing edge of the venturi ring to a greater or lesser extent. It has been found that the turbulence at this location will be reduced if the included cone angle between the opposite sides of the venturi ring outlet valve is of approximately 60° and the rim is extended downstream, as shown in solid lines in FIGS. 3 and 4, instead of being of the order of 90° with a shorter rim as shown in dot-dash lines in FIG. 4. The maximum cross-sectional size is approximately the same in both instances. The total reduction in turbulence of flow of blood through the valve assembly is a combination of the reduction in turbulence in the area 15 adjacent to the walls of the passage and in the central portion of the passage adjacent to and downstream from the valve ball. The reduction in turbulence effected by reducing the cone angle of the outflow valve and extending the trailing edge so that the external diameter will be approximately the same as if the included cone angle were 90° decreases the pressure drop across the valve 20percent over the pressure drop which occurs when a venturi ring seat having the larger cone angle is used with a valve ball 7' having a smooth periphery.

The provision of a roughened surface on the valve ball 7 such as one having dimples 8 as described above effects a further reduction of 20 percent in the fluid pressure drop across the valve assembly so that the total reduction in pressure drop for the valve assembly shown in FIG. 3 will be 40 percent over the drop which would occur with a ball valve 7' having a smooth surface as shown in FIG. 4 in combination with a valve seat ring having a cross-sectional shape as indicated in dot-dash lines in that figure. It is believed that such further reduction in pressure drop is the result of the separation of flow around the valve ball being postponed such as to the location indicated at 16 in FIG. 3 which is a substantial distance downstream from the central transverse plane of the valve instead of at the location 16' of FIG. 4 which is at or upstream from the transverse diametral plane of the ball. Such postponement of flow separation from the ball surface will also result in reduced turbulence in the center of the passage at 17 downstream from the valve ball, as indicated by comparing the flow lines at this location in FIG. 3 with those in FIG. 4.

Still further reduction in turbulence in the flow around the valve ball and further postponement of separation of flow from the surface of the ball can be achieved by provision of a flow-directing or control ring carried by the cage rods. One form of such modified cage is shown in FIGS. 5 and 6 as including three equally spaced axially extending rods 5' having one end mounted on the outlet bell 4 of the venturi ring 1 and having their downstream ends connected by a ring 6'. This ring replaces the curved portions of the rods 5 which are connected by the joint 6 as shown in FIGS. 1 and 2. The ring 6' having a faired or streamline cross section with its major axis generally aligned with the direction of flow and its minor axis extending transversely of the direction of flow, such as shown in FIG. 5, will divide the flow around the ball or direct the flow at the location 16 shown in FIG. 3 immediately after it has separated from the surface of the ball. In either case, such flow will be directed smoothly toward the central portion 17 of the passage as shown in FIG. 3 so that the turbulence in this area will be reduced, resulting in a further decrease in pressure drop across the valve.

An alternative form of the cage is illustrated in FIG. 7 in which the axially extending cage rods 5' are connected by a ring 6" at a location between their ends and a substantial distance upstream from their trailing ends. In fact, such ring is located substantially in the diametral transverse plane of the valve ball in the open position indicated in dot-dash lines in FIG. 7. Such ring is, however, spaced from the great circle of the ball which it encircles so that the ring divides the flow of blood past the ball for reducing its turbulence. Such ring also has a faired or streamline cross section as shown in FIG. 7.

I claim:

1. A prosthetic ball-check heart valve comprising a seat ring having a substantially conically flared outlet the diametral included cone angle of which is approximately 60°, means for attaching said ring in a heart system blood passage, a valve ball seatable on said ring for preventing reverse flow of fluid therethrough, and means carried by said seat ring and engageable by said valve ball to limit the extent of movement of said valve ball away from said seat ring.

2. The heart valve defined in claim 1, in which the entire surface of the valve ball is roughened substantially uniformly.

3. The heart valve defined in claim 2, in which the entire surface of the valve ball is roughened substantially uniformly by having depressions of substantial area distributed over the ball surface.

4. The heart valve defined in claim 2, in which the entire surface of the valve ball is roughened substantially uniformly by being dimpled.

5. A prosthetic ball-check heart valve comprising a seat ring having a conically flared outlet, means for attaching said ring in a heart system blood passage, a valve ball seatable on said ring for preventing flow of fluid therethrough and having its entire surface roughened substantially uniformly, and means carried by said seat ring and engageable by said valve ball to limit the extent of movement of said valve ball away from said seat ring.

6. The heart valve defined in claim 5, in which the entire surface of the valve ball is roughened substantially uniformly by having depressions of substantial area distributed over the ball surface.

7. The heart valve defined in claim 5, in which the entire surface of the valve ball is roughened substantially uniformly by being dimpled.